United States Patent

Heym

Patent Number: 5,695,305
Date of Patent: Dec. 9, 1997

[54] FEED DEVICE FOR MACHINE TOOLS, IN PARTICULAR FOR FINISHING SCREWDRIVER BITS

[75] Inventor: Hans Udo Heym, Wuppertal, Germany

[73] Assignee: Wera Werk Hermann Werner GmbH & Co., Wuppertal, Germany

[21] Appl. No.: 513,758

[22] PCT Filed: Feb. 26, 1994

[86] PCT No.: PCT/EP94/00567

§ 371 Date: Aug. 18, 1995

§ 102(e) Date: Aug. 18, 1995

[87] PCT Pub. No.: WO94/19149

PCT Pub. Date: Sep. 1, 1994

[30] Foreign Application Priority Data

Feb. 27, 1993 [DE] Germany .................. 43 06 109.5
Apr. 16, 1993 [DE] Germany .................. 43 12 526.3

[51] Int. Cl.⁶ .................................................. B23B 13/00
[52] U.S. Cl. .......................... 409/228; 409/197; 409/165; 82/124; 82/127
[58] Field of Search .................. 82/124, 127; 29/38 A, 29/38 B, 38 R; 409/165, 197, 226, 228; 279/45, 46.1, 46.2, 20.1, 22, 23.1

[56] References Cited

U.S. PATENT DOCUMENTS

| 2,409,899 | 10/1946 | Resina | 279/22 |
| 2,496,545 | 2/1950 | Kraemer | 279/46.1 |
| 3,038,636 | 6/1962 | Hamilton | 29/37 R |
| 3,565,142 | 2/1971 | MacQueston | 144/112 |
| 3,890,682 | 6/1975 | Eckstein | 29/1.3 |
| 4,200,013 | 4/1980 | Momoi et al. | 82/2.5 |
| 4,794,831 | 1/1989 | Cheng . | |
| 4,863,321 | 9/1989 | Lieser | 409/165 |
| 4,900,202 | 2/1990 | Weinhold | 279/22 X |
| 5,228,371 | 7/1993 | Berns | 82/127 |

FOREIGN PATENT DOCUMENTS

| 484109 | 10/1929 | Germany . |
| 3827889 | 3/1989 | Germany . |

Primary Examiner—M. Rachuba
Assistant Examiner—Henry W. H. Tsai
Attorney, Agent, or Firm—Martin A. Farber

[57] ABSTRACT

The invention relates to a feed device for machine tools with chuck arranged at the free end of a spindle, to which chuck the workpiece is fed axially through the inside of the spindle from the rear by means of compressed air from a compressed air nozzle through the spindle (1) into the chuck (2), having a tool station arranged in front of the head of the chuck and having a stop which comes in front of the head of the chuck (2) in synchronism with the machining for halting the movement of the individual workpiece (8). In order to increase the productivity, a brake member is arranged in the axial hollow (11) of the spindle (1) between the entrance end and the chuck (2).

14 Claims, 8 Drawing Sheets

FEED DEVICE FOR MACHINE TOOLS, IN PARTICULAR FOR FINISHING SCREWDRIVER BITS

FIELD AND BACKGROUND OF THE INVENTION

The present invention relates to a feed device for machine tools which has a work chuck arranged on the free end of a spindle in accordance with the preamble to claim 1.

Such a device is known from U.S. Pat. No. 4,794,831. In that case, workpieces which are individualized to the rear of the spindle are blown by means of a nozzle rearward into the inside of the spindle. A second nozzle which is displaceable in the axial direction of the spindle is present in front of the head of the chuck. The head of this nozzle is developed as a rubber stop. Upon the insertion of the workpiece from the rear, this rubber stop is displaced in front of the chuck so that the individual workpiece introduced is stopped by striking against this stop. After the machining of the workpiece, the spindle opens and the second compressed-air nozzle blows the workpiece through the spindle back out of the chuck.

SUMMARY OF THE INVENTION

The object of the invention is further to develop a feed device of the type in question in a manner simple to manufacture so as to increase its productivity.

As a result of the development of the invention, the productivity of the apparatus has been increased. Between the entrance end and the chuck, a brake member is arranged. An individual workpiece which is introduced into the entrance end of the axial hollow of the spindle is braked by means of the brake member before reaching the stop. In this way, the workpiece enters the chuck with reduced speed. The momentum of the workpiece upon striking the stop is thereby reduced. In this way, damage to a, for instance, pointed workpiece upon striking against the stop is advantageously prevented, despite the high speed of introduction. In addition to this, the tendency for the workpiece to rebound from the stop and to come to rest only after repeated striking against the stop until it is grasped by the chuck is reduced. In accordance with the invention, the workpiece is introduced by the action of compressed air into the entrance end of the axial hollow of the spindle. By the continuous action of compressed air, the workpiece is accelerated in the axial hollow. Before reaching the chuck, the speed is reduced by the brake member, so that the workpiece leaves the brake member with reduced speed. The brake member is preferably formed by a change in cross section of the axial hollow. In this connection, the axial hollow can first of all have a round projection between the entrance end and the brake member and, behind the brake member, a cross section other than circular so that the brake member is formed by the change in cross section. The braking of the axial movement of the workpiece takes place at the same time as a rotary acceleration of the workpiece to the speed of rotation of the spindle. The brake member is preferably arranged directly in front of the chuck. It is advantageous if the brake member is developed as a resiliently yieldable projection which enters into the cross section of the axial hollow. A workpiece which is introduced through the feed channel formed by the axial hollow is braked by displacement of the brake member. However, it is also provided that the brake member is formed by a friction surface which can also extend resiliently into the cross section of the axial hollow. The axial hollow preferably rotates in the region of the brake member. In this way, the speed of rotation of workpiece and spindle is synchronized. It is advantageous if only a single nozzle is used for the loading and unloading. The compressed air is fed from of the compressed-air nozzle arranged to the rear of the chuck twice per machining cycle in the same direction. With the first air pulse, the workpiece is introduced into the chuck. After striking against the stop, movement is removed from the workpiece. As a result of the fact that the compressed air is still flowing, a rebounding of the workpiece which may then take place is harmless. The workpiece is moved again and again towards the stop by the compressed air so that it comes to rest there within a very short time. After the stop is moved back and the machining of the workpiece has taken place, the chuck and the second pulse of compressed air pushes the workpiece out of the chuck, past the stop which has been moved back. The workpiece then lands in a workpiece receiving device which is arranged, for instance, below the spindle. The further development is characterized by increased economy. As compared with the aforementioned, and particularly other, known developments, the machining times per piece can be considerably reduced. The workpieces are not, as is customary, pushed one after the other through the spindle from the rear, but they are, in each case, driven as individual workpieces by compressed air through the spindle with the chuck open. The stop which passes, in the machining cycle, in front of the head of the chuck prevents the individual workpiece from dropping out of the chuck. By means of the stop the result is obtained that a quiet required protrusion of the workpiece beyond the chuck is always present. With this, precise machinings of the workpieces are possible. As soon as the workpiece has reached its proper position limited by the stop, the chuck closes, the stop moves back, and the machining of the workpiece at the tool station commences. The introduction of the individual workpiece by compressed air can take place with the spindle in operation so that the starting and stopping times do not constitute loss times upon the machining. As workpiece to be machined a screwdriver-bit blank preferably enters into consideration. It has a hexagonal clamping section seen in cross section and a cylindrical front section in which a profiling is then cut by milling tools. The stop against which the workpiece is pushed is preferably displaced transverse to the direction of the spindle axis. In this connection, either a linear displacement perpendicular to the direction of the spindle axis or a swinging displacement can be provided. In the case of the latter, the axis of swing of the stop is preferably parallel to the spindle axis. As a result of this development, the distance of the stop from the chuck can be reproducibly repeated.

One advantageous further development consists therein that the compressed air is fed in two pulses per machining cycle of the workpiece in the manner that the one pulse serves for feeding the workpiece and the next pulse for ejecting it past the backward moved stop. It has been stated above that the stop is moved back during the machining of the workpiece. It initially remains in this position. After the completion of the machining, the chuck opens so that the brake member can be driven out of the chuck by compressed air. The stop then moves into its stop position. Thereupon, upon the next pulse, the workpiece is passed through the spindle to the chuck until it strikes against the forwardly moved stop.

Furthermore, the solution in accordance with the invention is characterized by the fact that, for the feeding of workpieces of non-circular, for instance polygonal, cross section, for instance bits, the compressed air forces the workpiece against a continuously rotating transition step between a non-circular cross-sectional shape adapted to the cross section of the workpiece and a cross-sectional shape, surrounding this, of the axial hollow of the spindle and transfers it to the non-circular region for rotational entrainment after the braking of the axial movement. In this connection, the axial hollow which is developed in the form of a bore, forms the surrounding cross-sectional shape which the non-circular region adjoins. The latter is adapted to the cross section of the polygonal bit. The bit, which is acted on by the compressed air, passes through the axial hollow and is halted by the step since, as a rule, there is no aligned agreement between the cross sections of non-circular region and bit and simultaneous synchronization of the speed of rotation. Due to the inherent inertial of the bit, a relative displacement takes place between bit and non-circular region so that the bit also enters into a position aligned with the non-circular region. The compressed air can therefore force the bit further up against the stop. The form-locked holding of the bit which is then present leads to a good rotational driving. Furthermore, the chuck need only be opened slightly in order to be able to receive the bit. Savings in time upon the closing and opening of the chuck result also from this.

In order for the workpieces to be passed individually through the axial hollow, a chute which receives the individual workpieces lying one behind the other and a device arranged between the chute and the entrance end of the axial hollow of the spindle are provided, for the separating in each case of one workpiece into the introduction position in front of the entrance end to the rear of which separation device a compressed air nozzle is arranged. The chute can in this connection be developed in the form of a pipe which is passed through by the workpieces. From there, the individual workpieces pass into the introduction position in front of the entrance end.

In detail, the separation device is characterized by the fact that it consists of a slide which is moved back and forth in synchronism. The individual workpieces come on to it after leaving the chute and are then brought into the insertion position by displacement of the slide.

It is furthermore provided in accordance with the invention that the stop for the halting of the individual workpiece is formed by a finger which moves back and forth in synchronism with the machining. Thus, it cannot happen that the shooting out of the workpiece by compressed air is prevented. The finger assumes its advance position only when an individual workpiece is introduced.

In accordance with the invention, it is provided that the transition step from the surrounding cross section to the non-circular cross section lies in the region of the chuck.

Different machinings can be produced on the workpiece in the manner that the tool station is developed as fly-cutter milling head the tool shaft of which extends, offset with respect to the spindle, in front of the head of the chuck and rotates in a constant speed relationship to the spindle which is dependent on the number of profile surfaces to be produced on the free end of the individual workpiece. If a tool shaft which extends transverse to the spindle is present, then longitudinal grooves can be produced on the workpiece. An alignment of the tool shaft parallel to the spindle makes it possible to produce polygonal surfaces on the workpiece.

In order that the stop and tool shaft do not detrimentally affect each other, the tool shaft is arranged opposite the finger which forms the stop.

Furthermore, it is also advantageous, in accordance with the invention, for the separating slide to have a groove coming below the chute for the dropping-down of the individual workpieces, which groove, after passage of the slide into its position in front of the entrance end of the spindle, is closed by a cover of the device. In this way, the passage of the individual workpiece from the chute to the slide can take place without problem. If the slide then moves into the transfer position, the groove is closed on the top so that the compressed air shoots the individual workpiece as intended in the direction of the chuck.

The alignment with correct angle of rotation in combination with the braking of a polygonal bit with the non-circular region is improved by angle-position adjustment members which are associated with the rotating transition step, come against the polygonal surfaces of the workpiece, are arranged in accordance with the non-circular region, and are acted on with spring action in radial inward direction. These adjustment members effect a positive rotational alignment of the polygonal workpiece in the manner that the aligned arrangement of workpiece cross section and that of the non-circular region is present. The alignment with respect to the non-circular region takes place even with maximum turned position of the workpiece, and to be sure for a very short time. On the other hand, the angle-position adjustment members are so positioned that, in the event of a possible aligned arrangement of the polygonal workpiece to the non-circular region, they do not prevent the transport of the workpiece.

It has proven advantageous to develop the angle-position adjustment members as rolling bodies with curvature of the outer surface facing the direction of transport of the workpiece lying in axial direction. The curvature of the outer surface of the rolling bodies produces in this connection, in a certain respect, a centering effect with the avoidance of even only a brief back-up in connection with the passage of the workpiece.

If the workpiece is developed as a hexagonal screwdriver bit, it is advisable, with the non-circular region also having a hexagonal cross section, to provide three rolling bodies arranged at equal angles apart.

As an alternative, it is possible for the rolling bodies to be developed as balls which protrude beyond the size of the polygon. This shape is very simple from a structural standpoint and it is characterized by a high degree of reliability. It is constantly seen to it that the balls do not extend too far into the passage region for the workpiece.

Differing from the device of this type in accordance with U.S. Pat. No. 4,794,831, the feeding of the compressed air is effected by a single compressed air nozzle which forces the compressed air through the spindle always in the same direction.

The development of the brake member as spring-mounted rolling bodies developed as balls is, however, used also independently of the cross-sectional shape of the workpieces. It is important for the brake members to extend in cross-section-reducing manner into the feed channel. The workpiece of rotational symmetry is then braked when the largest cross section of the workpiece is greater than the cross-sectional contour of the feed channel reduced by the brake members.

BRIEF DESCRIPTION OF THE DRAWINGS

With the above and other advantages in view, the present invention will become more clearly understood in connection with the detailed description of preferred embodiments, when considered with the accompanied drawings, of which.

DETAILED DESCRIPTION OF THE PREFERRED EMBODIMENTS

Figure 1:
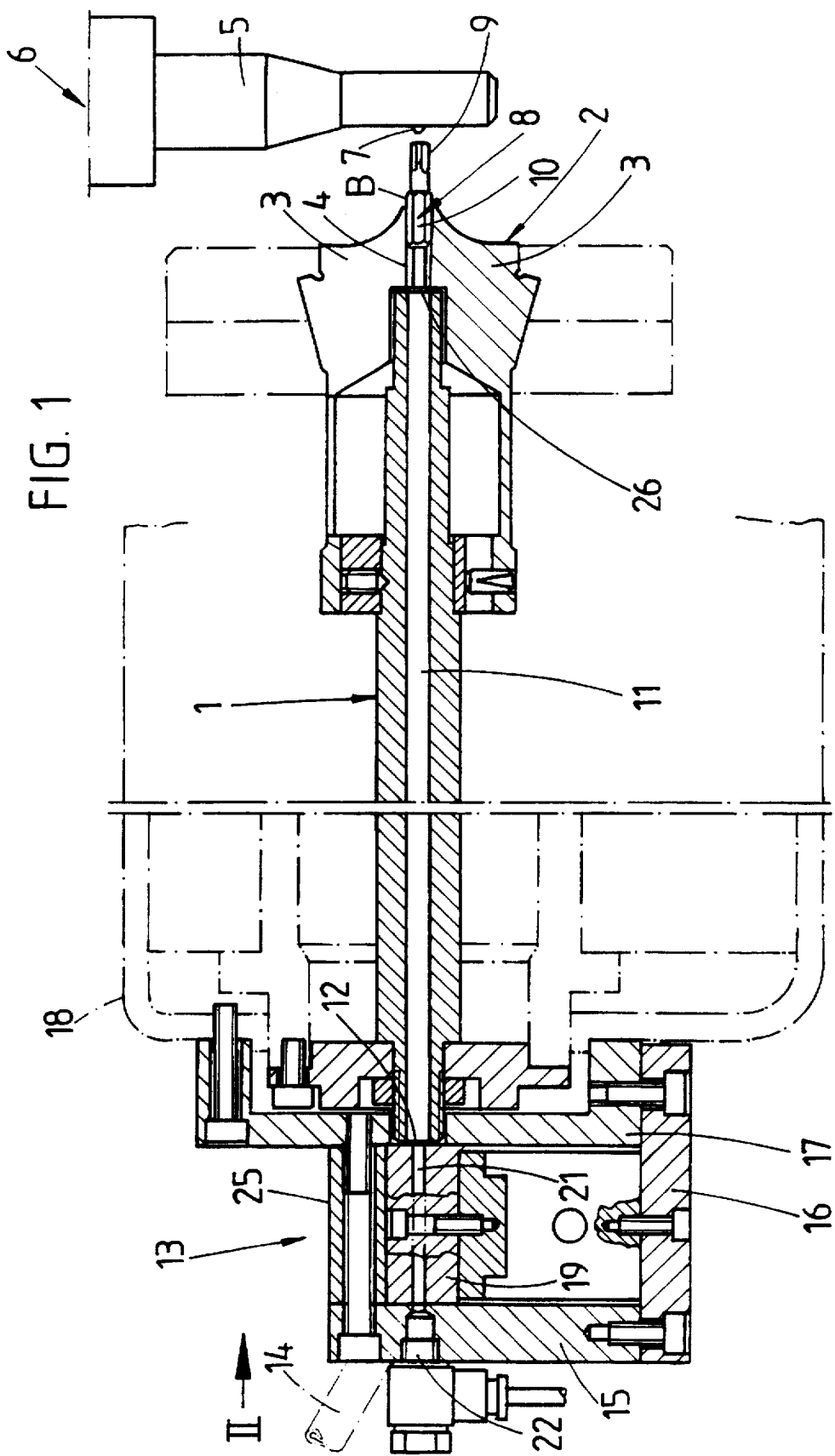
FIG. 1 is a longitudinal section through the apparatus, plus spindle, with the chuck of which there is associated a tool shaft, in the case of the first embodiment.
Figure 2:
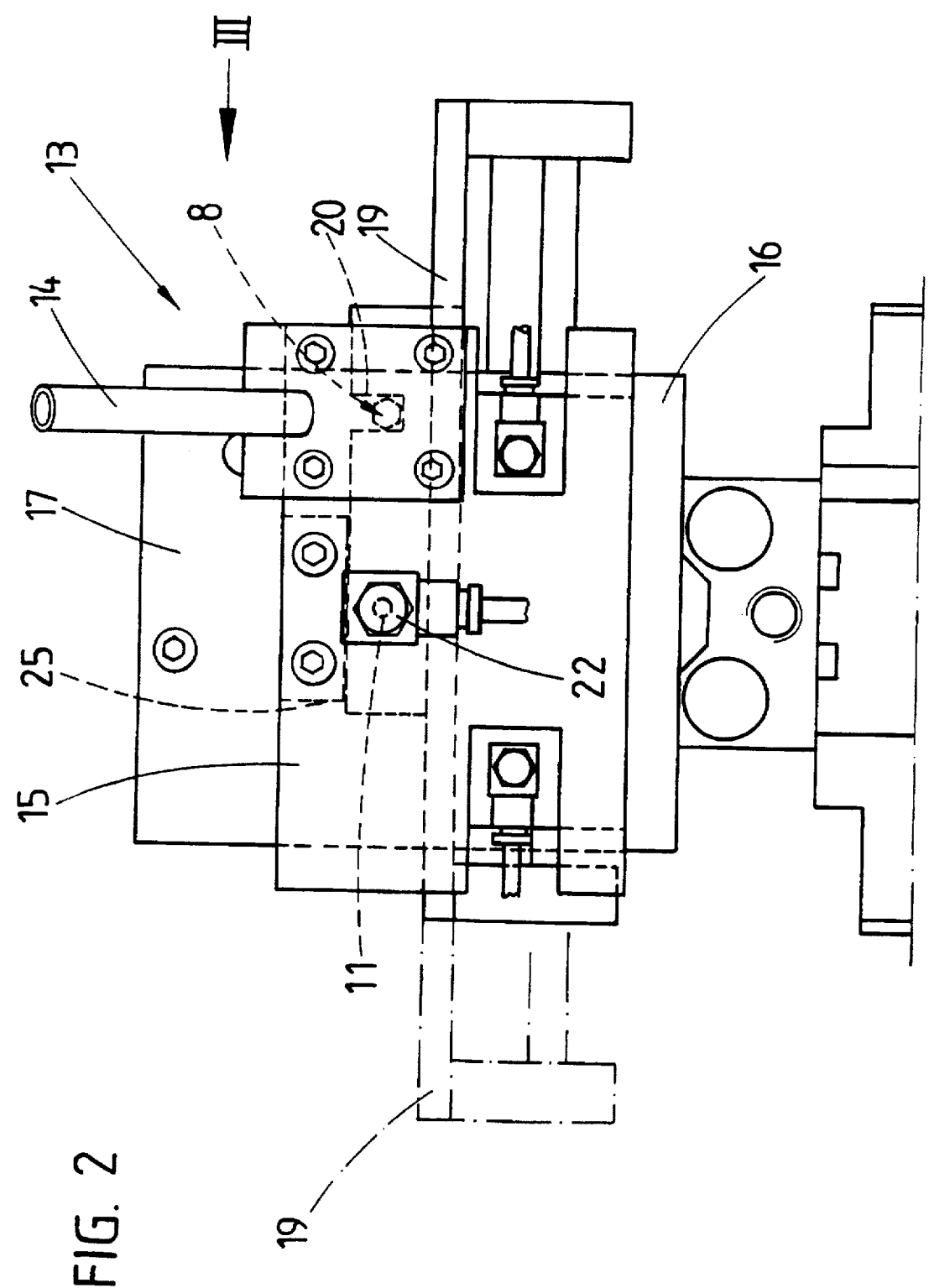
FIG. 2 is a view in the direction of the arrow II of FIG. 1.
Figure 3:
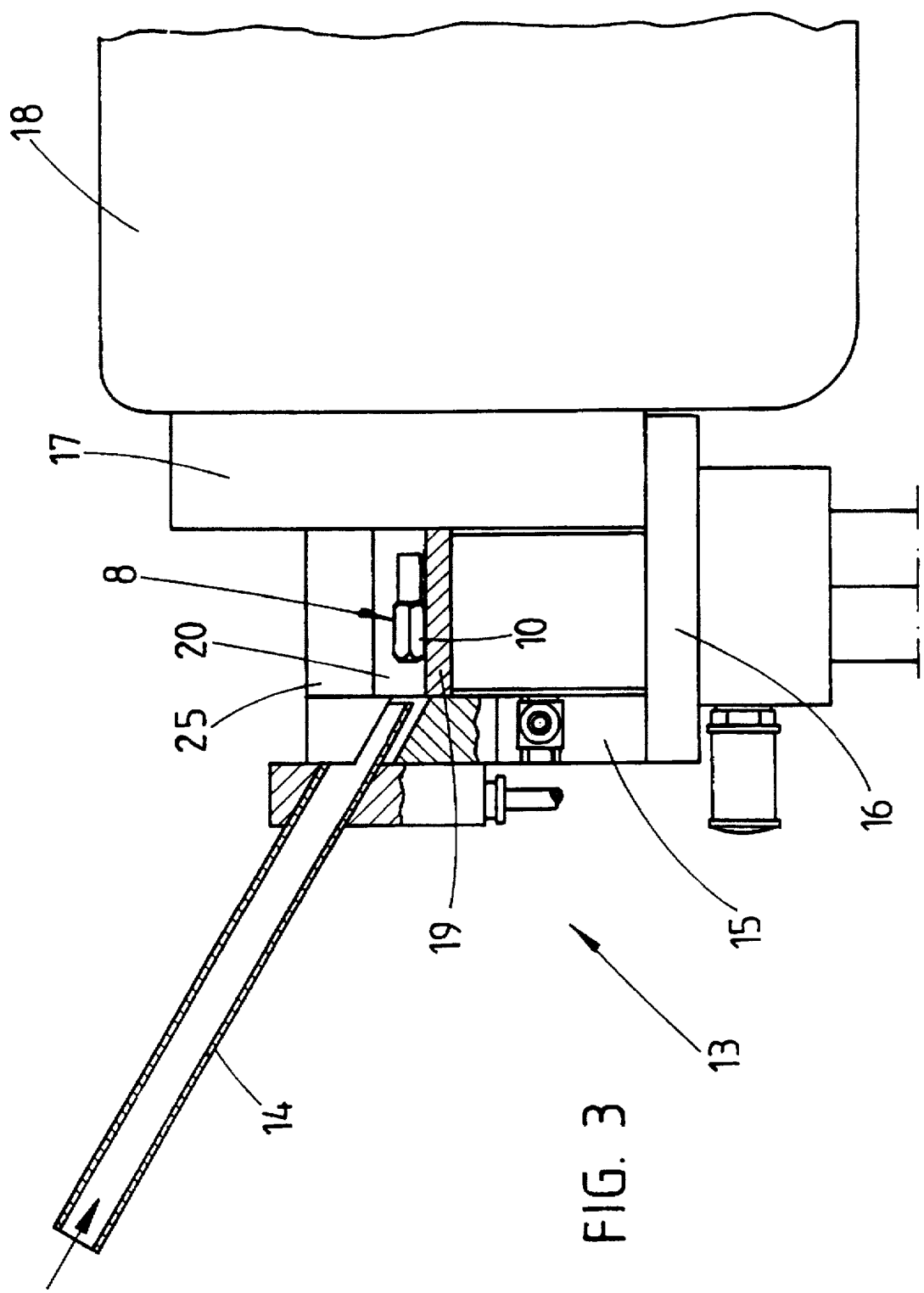
FIG. 3 is a view in the direction of the arrow III of FIG. 2, partially broken away.

In accordance with the first embodiment, the rotationally driven spindle of a fly-cutter milling machine is designated 1. On its free end, the spindle bears an automatically closing and opening chuck 2. The inner surfaces of the chuck jaws 3 form a non-circular region 4 in the manner of a hexagonal hole. Transverse to the spindle 1, a tool shaft 5 of a tool station 6 extends in front of the head of the chuck 2. The tool shaft 5 is equipped with a fly-cutter 7 and rotates in a constant speed ratio to the spindle 1. The speed ratio is dependent on the number of longitudinal grooves 9 to be produced on the free end of an individual workpiece 8. The individual workpiece 8 in this embodiment is a screwdriver bit B. Its one end is developed as a hexagon 10, while its other end has the longitudinal grooves 9 in order to assure a form-locked engagement with a screw. In FIG. 1, it is shown that the hexagon 10 lies in the non-circular region 4 of the chuck 2 and is clamped there.

The chuck 2 is furthermore firmly attached to the spindle 1. This means that the two rotate together. Centrally within the spindle 1 there is a continuous axial hollow 11. It has a circular cross-sectional shape. The diameter of the axial hollow corresponds to the width across corners of the hexagon 10 so that a screwdriver bit B can pass through the axial hollow 11, the latter forming a cross-sectional shape surrounding the hexagon 10.

In front of the entrance end 12 of the spindle 1 which is opposite the chuck, there is a feed device 13 for the feeding of workpieces 8. In detail, the feed device comprises a chute 14 which receives the individual workpieces lying one behind the other, the chute being in the form of a pipe. The pipe rises obliquely. The lower end of the chute 14 passes through a side plate 15 which is directed perpendicular to the spindle 1. Via a base plate 16, it is connected with a side plate 17 which is arranged parallel to it and is fastened, stationary, to a housing indicated in dash-dot line which surrounds the spindle 1. Between the side plates 15, 17, there is guided a slide 19 which forms a separating device which can be moved back and forth in synchronism. The drive of the slide 19 is not shown in detail, but is effected by compressed air in the embodiment shown.

With the separating slide 19 moved backward, an upwardly open groove 20 forward in the separating slide 19 for the reception of one individual workpiece 8 each extends below the outlet opening of the chute 14. A continuous blast opening 21 extends in the slide 19 parallel to the groove 20. The center-to-center distance between groove and blast opening 21 corresponds to the stroke of the slide 19. With the slide 19 moved back, the blast opening 21 is aligned with the axial hollow 11 and extends directly in front of the entrance end 12. Furthermore, in this position, the blast opening 21 is aligned with a compressed air nozzle 22 which is held fast on the side plate 15 and is in communication with the blast opening 21. The compressed air nozzle 22 is in communication with a compressed air generator, not shown.

Furthermore, the machine tool has a guide, arranged in front of the head of the chuck 2, to receive a stop 24 which is shaped as a finger which moves backwards and forwards in phase with the machining. The stop 24 moves up to the height of the axial hollow and constitutes a limitation for the individual workpiece 8 received by the chuck.

Figure 4:
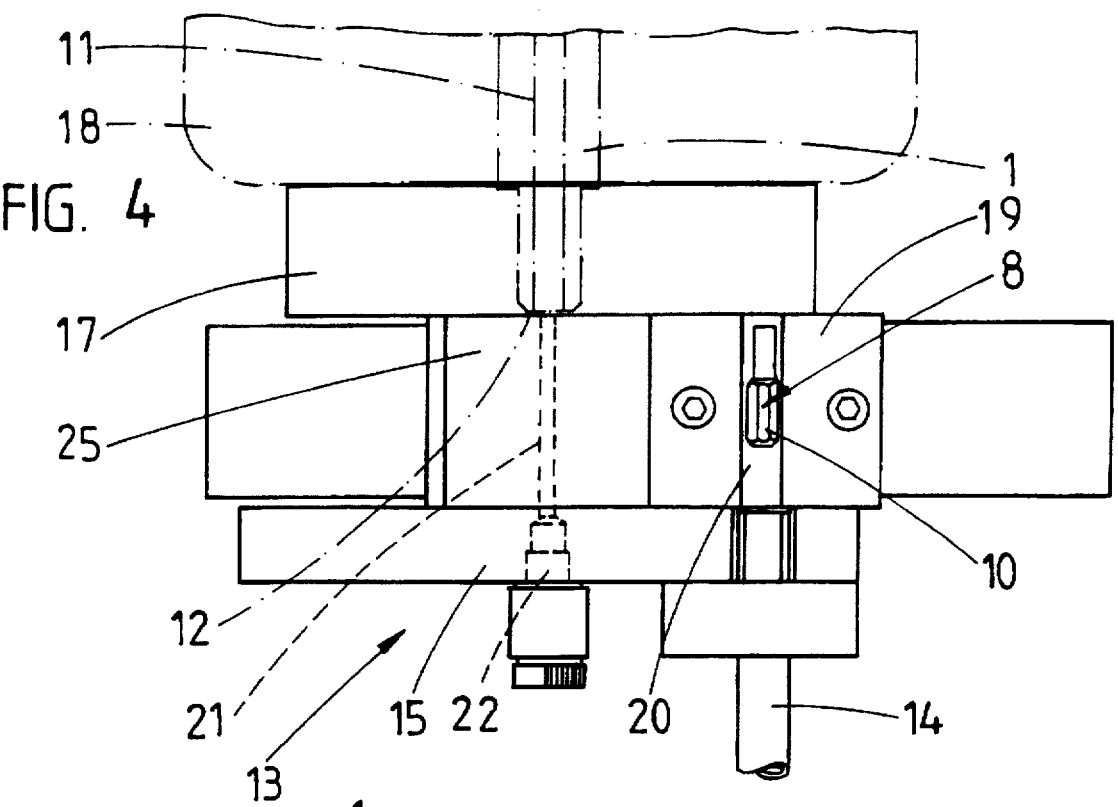
FIG. 4 is a top view of the device with slide in loading position.
Figure 5:
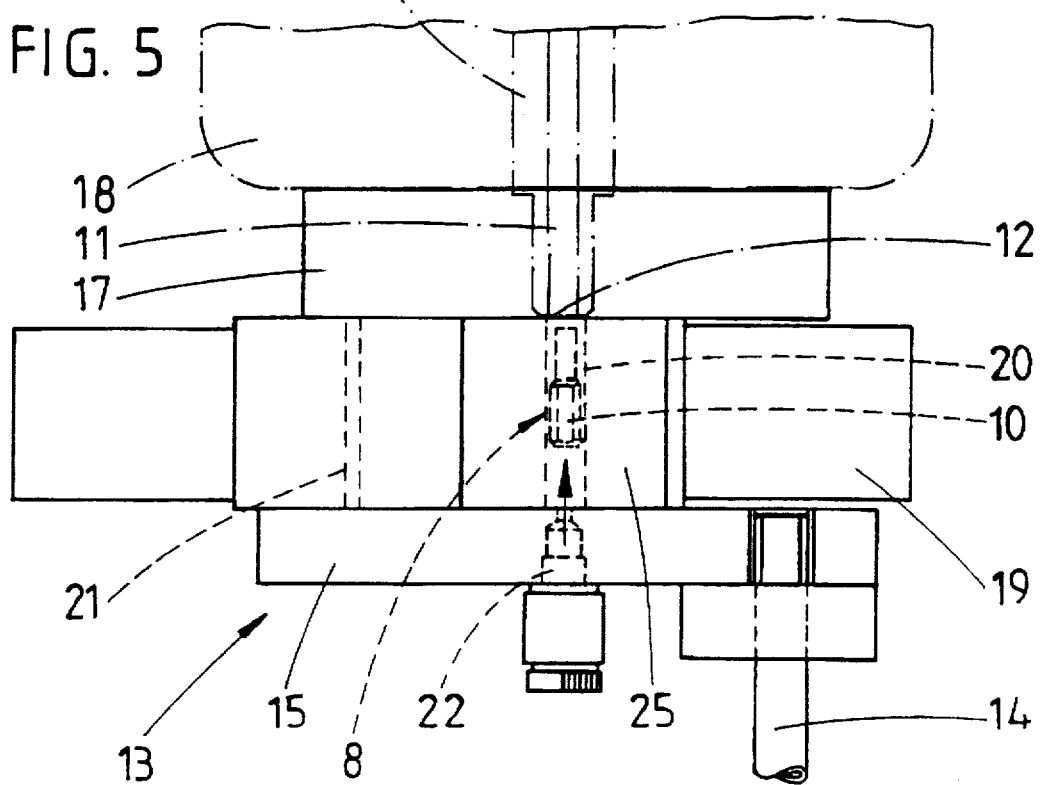
FIG. 5 is a view corresponding to FIG. 4 the slide being in the insertion position.
Figure 6:
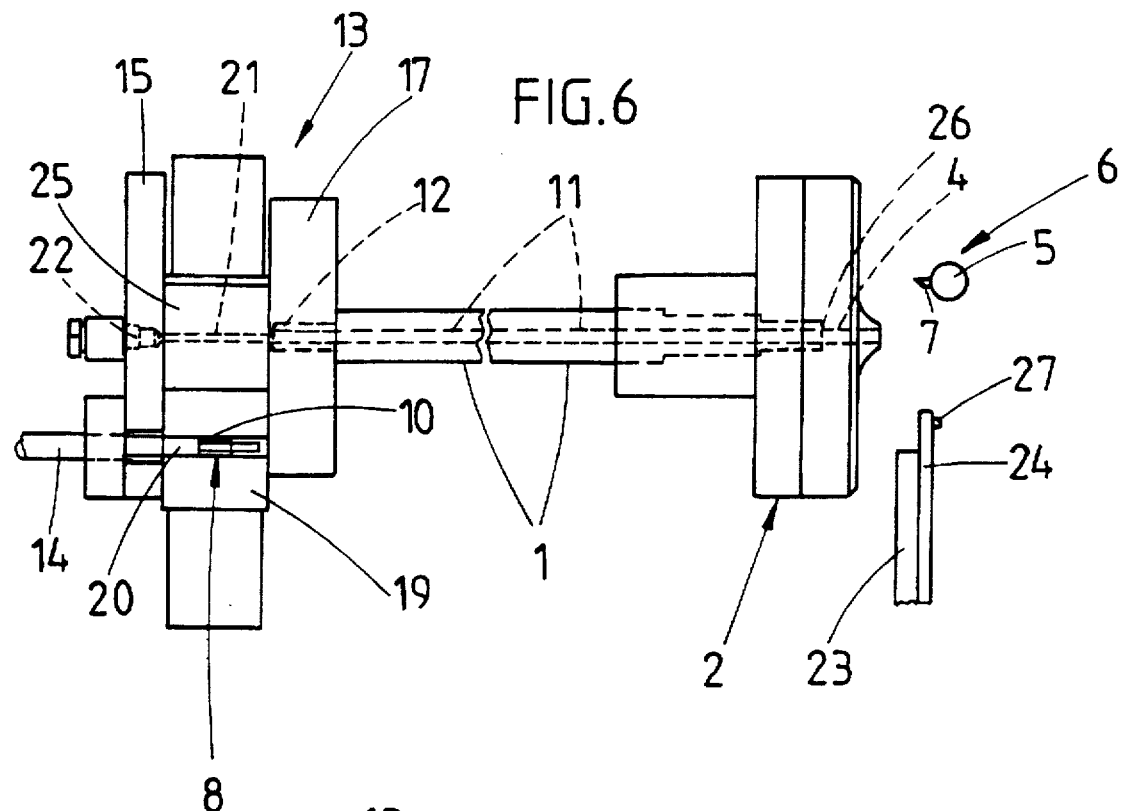
FIG. 6 shows diagrammatically the loading position of the slide with the stop moved back.
Figure 7:
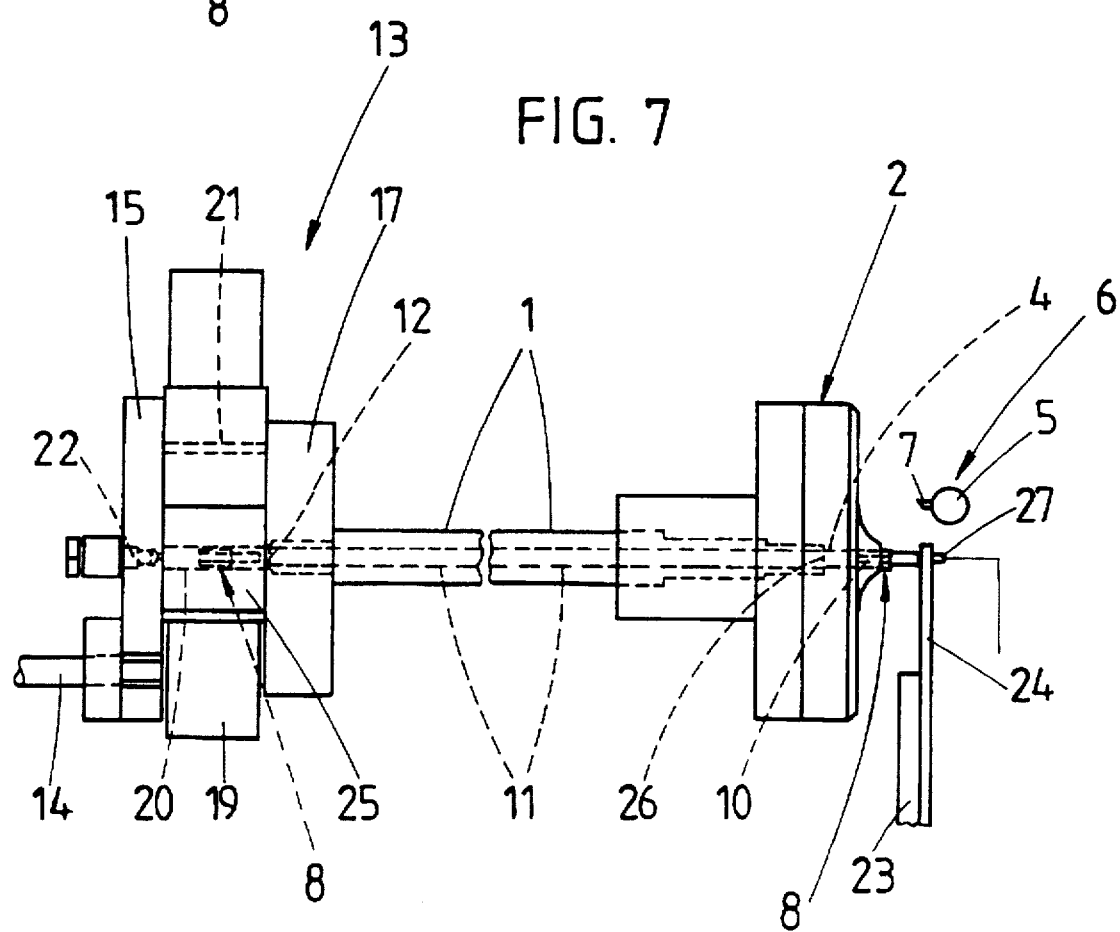
FIG. 7 is the following showing in which the slide has moved forward into the position of introduction of the workpiece, with the stop having passed into the resting position.
Figure 8:
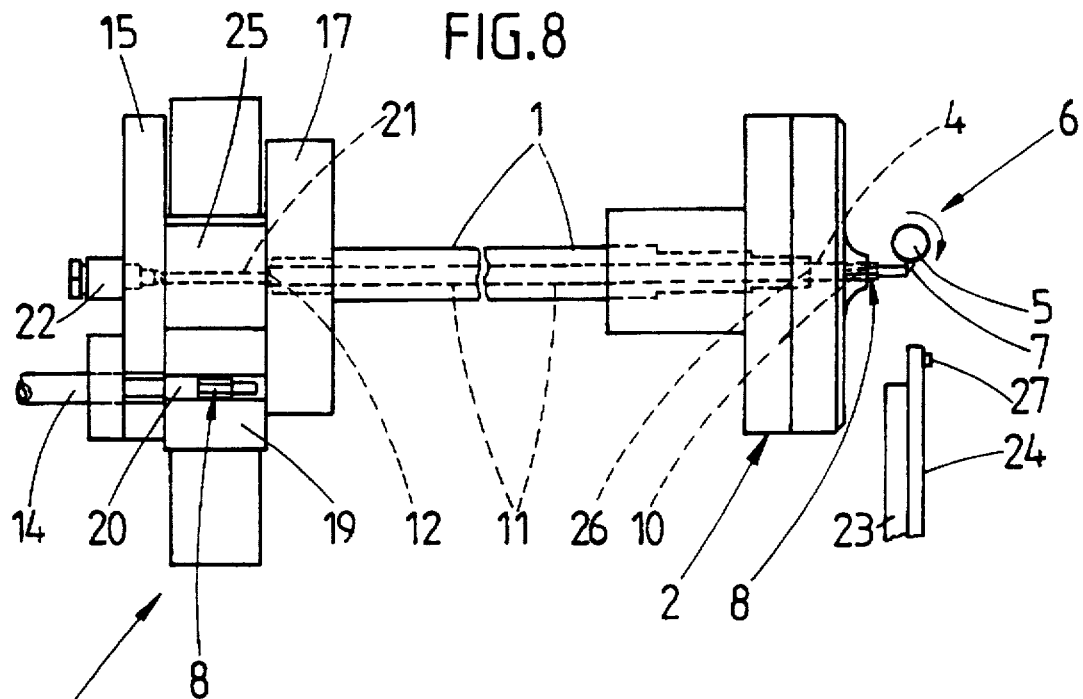
FIG. 8 is the subsequent showing with the stop moved back and the tool shaft having passed into operating position and the slide assuming the loading position.
Figure 9:
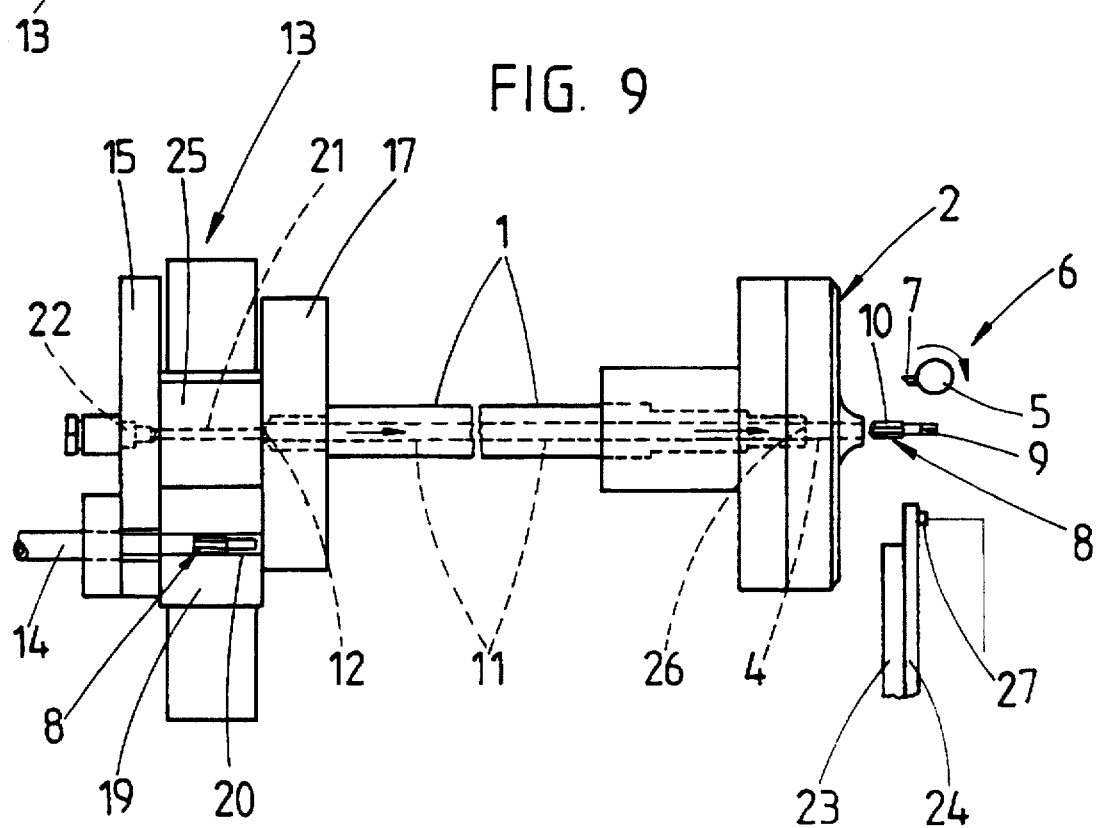
FIG. 9 is a following showing in which the completely machined workpiece is ejected by means of the compressed air nozzle.

The manner of operation is as follows:

The spindle 1 rotates continuously during the machining of individual workpieces 8. This is true also during the opening and closing of the chuck 2. FIGS. 4 and 6 show the starting position. In it, the slide 19 is moved back; the same is true also of the stop 24. In the backward-moved position of the slide 19, the groove 20 is aligned with the outlet opening of the chute 14, so than an individual workpiece 8 can enter into the groove 20. Thereupon, the impulse for the displacement of the slide 19 and of the stop 24 is given. The stop moves into the position shown in FIG. 7 and its front region thus crosses the middle line passing through the axial hollow 11. The slide 19 also moves forward. In this way, the groove 20 comes into aligned position with the axial hollow 11 of the spindle 1 and the compressed air nozzle 22. In this forward position of the slide 19, the groove 20 is closed by a cover 25 which extends between the side plates 15, 17. The compressed air nozzle 22 which expels compressed air pulsewise is now fed with compressed air, as a result of which the individual workpiece 8 is moved into the axial hollow 11, with the spindle 1 rotating. The circular cross section of the individual workpiece 8 enters into the non-circular region 4. It can then still be the case that with hexagon 10 and non-circular region 4 not aligned, the hexagon 10 rests on the transition step 26 between the surrounding cross-sectional shape and the adapted cross-sectional shape. Due to its inertia, however, the individual workpiece 8 passes with its hexagon into aligned agreement with the non-circular region 4 of the chuck 2, whereupon the compressed air drives the individual workpiece 8 further forward. The forward movement is limited by the stop 24; see FIG. 7. A pulse transmitter 27 present on the stop 24 registers the proper position of the individual workpiece, whereupon the chuck 2 closes and clamps the hexagon 10 in part or over its entire length. At the same time, the stop 24 moves back while the tool shaft 5 of the fly-cutter milling head which lies opposite it moves into the machining position and machines the longitudinal grooves 9 into the circular end section of the individual workpiece. In synchronism with this, the slide 19 is also moved back so that its groove 20 is aligned with the outlet opening of the chute 14. A new individual workpiece 8 then enters into the groove 20. In this backward displaced position, the blast opening 21 of the slide 18 is also aligned both with the axial hollow 11 of the spindle 1 and with the compressed air nozzle 22. As soon as the individual workpiece 8 has been machined, the tool shaft 5 moves back into its starting position. The chuck 2 opens and by the next cycle of the compressed air nozzle 22 compressed air is conducted through the blast opening 22 into the axial hollow 11, as a result of which the machined individual workpiece 8 is ejected; see FIG. 9. The process described above is then repeated.

As an alternative, it would also be possible to form the axial hollow 11 with a non-circular cross section so that its cross section is adapted to that of the hexagon 10. In such case, the transition step would then be present at the entrance end of the spindle. In the embodiment shown, the transition step 26 is located in the region of the chuck 2.

Furthermore, it would be possible to associate two compressed air nozzles with the separating device. The one nozzle can then serve to expel the completely machined individual workpiece, while the other nozzle effects the insertion of the individual workpiece.

In the embodiment shown in FIGS. 10 to 13, the same parts have been provided with the same reference numerals. The spindle 1 which bears the chuck 2 is also provided with an axial hollow 11 of circular cross section. The spindle 1, together with the chuck 2, rotates continuously, namely also during the loading of the chuck with a screwdriver bit B as well as upon the removal thereof from the chuck 2. Furthermore, the inner surfaces of the jaws 3 of the chuck 2 form a central non-circular region 4 in the form of a hexagonal hollow which is adapted in shape to the hexagon 10 of the individual workpiece 8.

Figure 10:
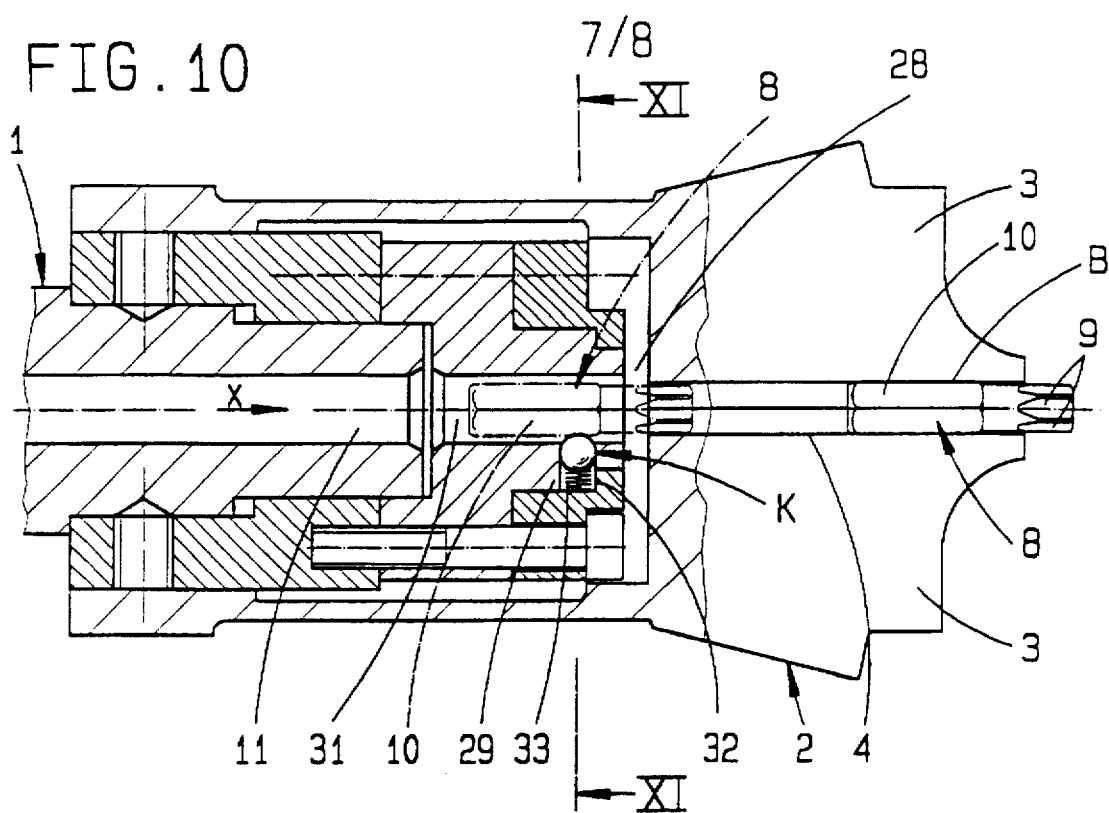
FIG. 10 is, in an individual showing, a longitudinal section through the end of the spindle facing the chuck, the angle-position adjustment members being provided in the region of the transition step, in the case of the second embodiment of the apparatus.

The direction of transport of the individual workpiece 8 is indicated by x in FIG. 10. In the immediate vicinity in front of the transition step 28 between axial hollow and non-circular region 4, a bushing 29 which is connected, fixed for rotation, with the spindle 1 in a manner not shown in detail, receives three angle-position adjustment members K which are arranged a uniform angle apart. In the embodiment shown, they are developed as rolling bodies, namely as balls 30 which are urged by spring in radial inward direction. A central bore 31 of the said bushing 29 forms the extension of the axial hollow 11. The diameter of the axial hollow 11 and that of the bore 31 are the same. Holes 32 are formed in the bushing 29 to receive the balls 30 in such a manner that the diameter of the balls decreases towards the bore 31. The balls 30 can therefore be displaced only a given amount in radial inward direction, namely by the compression springs arranged in the holes 32. The center lines M placed through the holes 32 are perpendicular to the hexagon surfaces of the non-circular region 4.

If the individual workpiece 8 is blown through the axial hollow 11 in the direction of the chuck 2 by cyclic feeding of compressed air, then the individual workpiece passes through the zone which is adjacent to the transition step 28 and provided with the balls 30. These balls 30 effect an alignment of the individual workpiece 8 so that the surfaces of the hexagon 10 extend aligned with those of the non-circular region 4 of the chuck 2. In FIG. 10, the individual workpiece 8 present between the balls 30 is indicated by dot-dash lines. The operating region provided with the longitudinal grooves 9 has partially passed the transition step 28 and already extends into the chuck 2 into its non-circular region 4. Due to the aligned arrangement of the hexagon 10 and the non-circular region 4, the undisturbed further transport of the individual workpiece 8 is established, namely up to the stop position.

Figure 11:
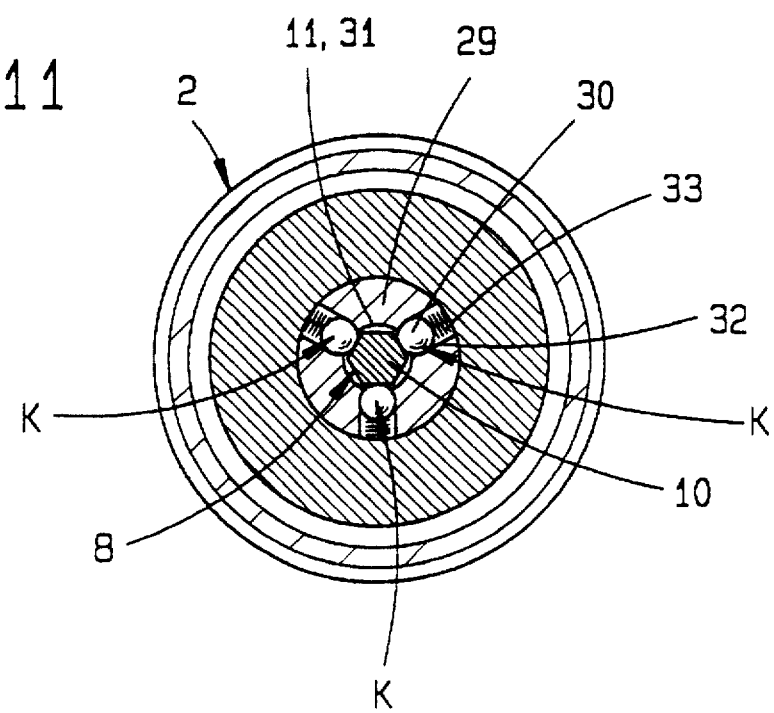
FIG. 11 is a section along the line XI—XI in FIG. 10.
Figure 12:
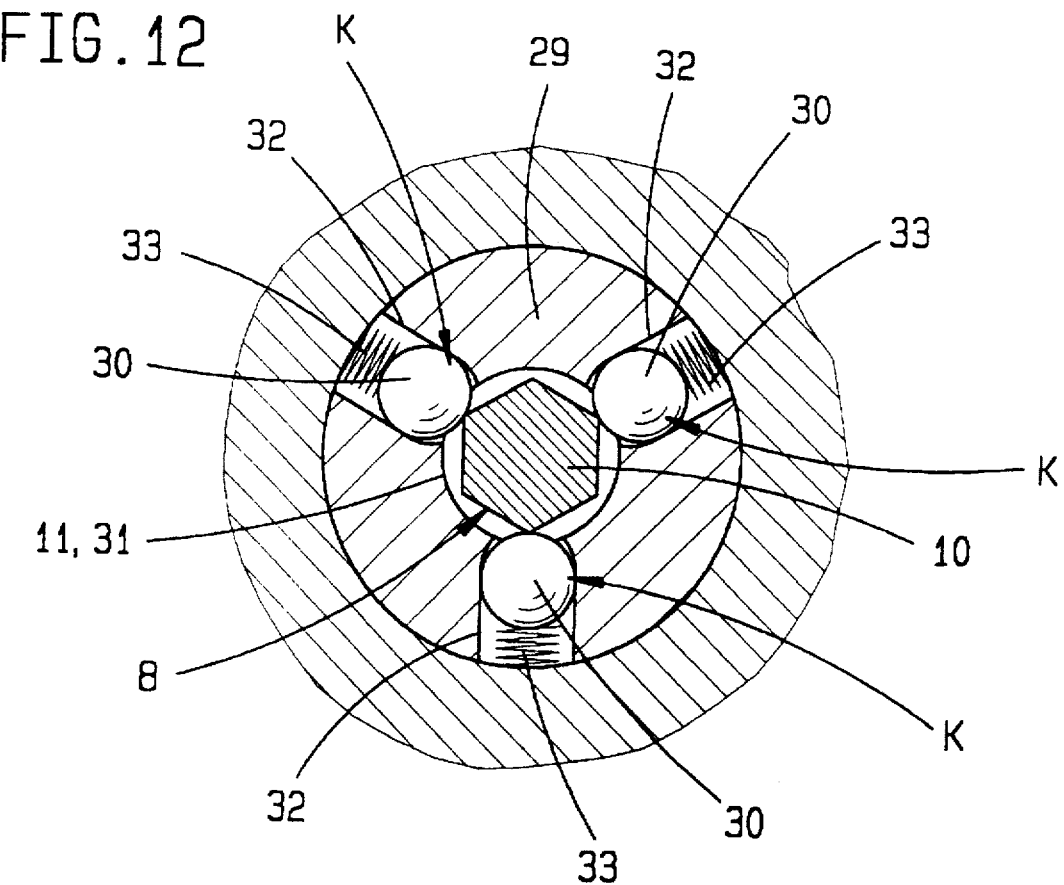
FIG. 12 is a detail showing of a cross section through the spindle in the region of the angle-position adjustment members, the hexagon of the workpiece assuming its most unfavorable alignment of rotation with respect to the angle-position adjustment members.
Figure 13:
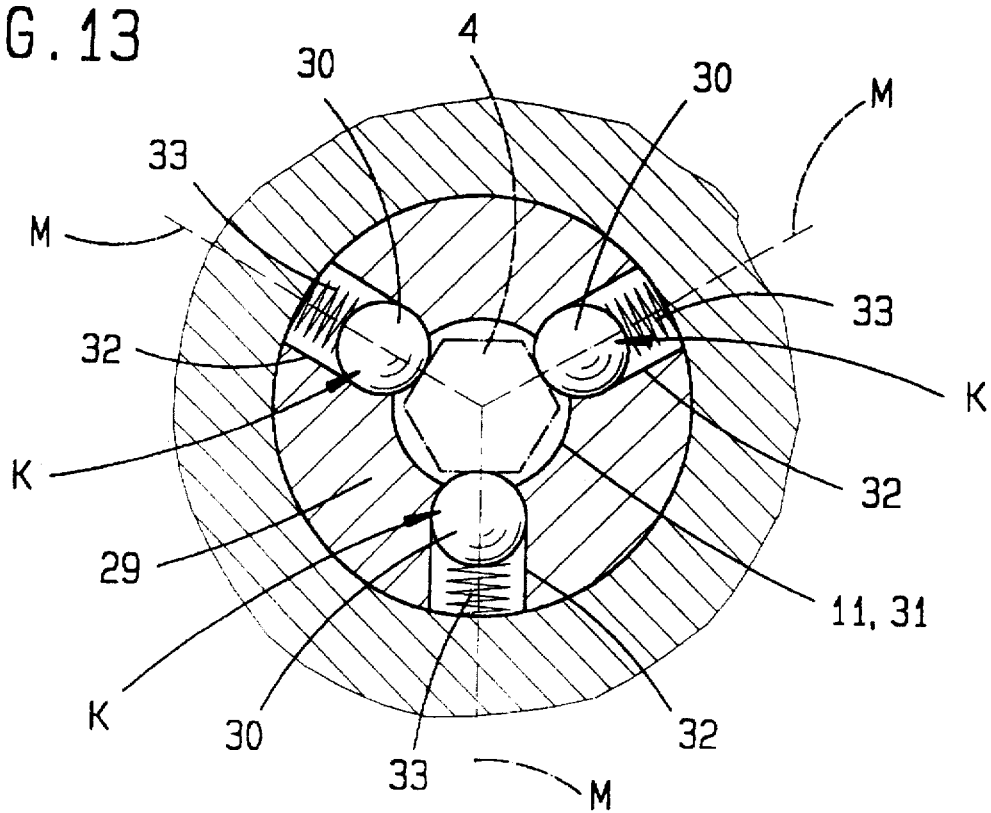
FIG. 13 is a showing corresponding to FIG. 12 in which the angle-position adjustment members developed as balls have protruded to the size of the polygon, with the non-circular region of the chuck shown in dashed line.

Even if, as shown in FIG. 12, the most unfavorable rotational alignment of the individual workpiece 8 is present, the balls are first of all displaced against spring action in radial outward direction by the corners of the hexagon 10. The balls 30, however, upon passage of the individual workpiece 8, produce a positive rotational alignment of the individual workpiece 8, in that they strive to rest on the corresponding hexagon surfaces of the hexagon 10 and thus positively produce the rotation, as shown in FIG. 11.

Instead of the balls 30, it would also be possible to use rolling bodies having a wall curvature in axial direction which faces the direction of transport x of the workpiece. A corresponding spring mounting of these roller bodies would also be possible.

The brake member formed by the balls 30 and/or the transition step 26, 28, reduces the speed of the workpiece introduced into the entrance end 12 of the feed channel 11. By the continuous action of the compressed air on the workpiece upon its passage through the feed channel 11, the workpiece is accelerated until reaching the brake member, namely the transition step 26, 28 or the roller bodies (K). Upon reaching the reduction in cross section, the workpiece is braked. The braking can be effected down to a speed of zero. Without axial speed, the workpiece then rolls in the round region of the axial hollow 11 as a result of the rotation of the latter until it lies adapted in cross section to the non-circular region. As a result of the continuous action of air pressure, the workpiece is then transported further up to the stop 24. In the event that the brake member is formed by resilient bodies K which extend into the feed channel 11, the adaptation of the angle of rotation to the position of the workpiece can also be effected by a jamming. In such case, a soft braking furthermore takes place.

I claim:

1. A machine tool with feed device comprising
    a chuck arranged at a free end of a continuously turning spindle to which chuck an individual workpiece is fed axially through an axial hollow inside of the spindle from a rear by means of compressed air from a compressed air nozzle through the continuously turning spindle into the chuck,
    a tool station arranged in front of a head of the chuck,
    a stop which, in a machining cycle, comes in front of the head of the chuck in order to stop movement of the individual workpiece,
    a brake member arranged in the axial hollow of the spindle between an entrance end thereof and the chuck, said brake member having a form of a transition step of a first spindle section and a second region, said transition step allowing passage of the workpiece completely therethrough, the compressed air pressing the workpiece against said step for stopping the workpiece,
    for feeding of the workpiece having a non-circular cross section, the second region has a non-circular cross section which is adapted to the non-circular cross section of the workpiece, and the first spindle section has a cross section which surrounds the workpiece, and said transition step is so arranged behind the head of said chuck that the workpiece leaves the brake member with reduced speed in order to come against said stop.

2. A feed device according to claim 1, wherein the brake member is arranged directly in front of the chuck.

3. A feed device according to claim 1, further comprising a chute which receives the individual workpieces lying one behind the other, and a separating device arranged between the chute and the entrance end of the axial hollow of the spindle for separating workpieces in an introduction position in front of the entrance end of the spindle hollow, wherein the compressed nozzle is arranged to the rear of said separating device.

4. A feed device according to claim 3, wherein the separating device comprises a slide which is moved back and forth in synchronism.

5. A feed device according to claim 4, wherein the separating slide has a groove which comes below the chute for dropping therein of the individual workpiece, which groove is closed by a cover of the device after the slide has moved into its position in front of the entrance end of the spindle.

6. A feed device according to claim 1, wherein the stop for the halting of the individual workpiece is formed by a finger which moves back and forth in synchronism with the machining.

7. A feed device according to claim 1, wherein the transition step from the surrounding cross section to the non-circular cross section lies in a region of the chuck.

8. A feed device according to claim 1, wherein said tool station developed as a fly-cutter milling head, a tool shaft of which extends in front of the head of the chuck, is offset with respect to the spindle, and rotates in a constant speed ratio to the spindle, wherein the speed ratio is dependent on a number of profile surfaces to be produced on a free end of the individual workpiece.

9. A feed device according to claim 8, wherein said stop has the configuration of a finger, and the tool shaft is arranged opposite the finger of the stop.

10. A feed device according to claim 1, further comprising
an angular-position adjustment member (K) which is arranged resting on the non-circular region (4) and spring-biased in radially inward direction, is associated with the transition step (28).

11. A feed device according to claim 10, wherein the angle-position adjustment member is formed as a rolling body with curvature of outer surface in axial direction and facing the direction of transport of the workpiece.

12. A feed device according to claim 11, wherein with a hexagonal cross section of the non-circular region, three rolling bodies spaced at equal angles apart are provided.

13. A feed device according to claim 12, wherein the rolling bodies are balls which protrude to corner-to-corner distance of a polygon.

14. A feed device according to claim 10, wherein the brake member further comprises a resiliently retractable projection extending into the cross section of a rotating feed channel formed by the axial hollow of the spindle.

* * * * *